INVENTOR
CHAANG HUANG
BY Paul S. Martin
ATTORNEY

Nov. 10, 1959 CHAANG HUANG 2,912,596

TRANSISTOR SHIFT REGISTER

Filed March 23, 1954 3 Sheets-Sheet 2

INVENTOR
CHAANG HUANG
BY Paul S. Martin
ATTORNEY

INVENTOR
CHAANG HUANG
BY Paul S. Martin
ATTORNEY

United States Patent Office 2,912,596

Patented Nov. 10, 1959

2,912,596

TRANSISTOR SHIFT REGISTER

Chaang Huang, Ipswich, Mass., assignor, by mesne assignments, to Sylvania Electric Products Inc., Wilmington, Del., a corporation of Delaware Application March 23, 1954, Serial No. 418,116

1 Claim. (Cl. 307—88.5)

The present invention relates to computing devices, in particular to binary shift registers. Advantageously, shift registers in accordance with features of the present invention can store and shift binary information series of any pattern, that is the register is effective despite the occurrence in an information series of successive input signals of the same polarity.

Shift registers, such as magnetic-core or magnetic delay line registers are known for the storage and shifting of an information series of signals, such that the signals may be available at a time when a particular function is to be accomplished. Briefly, operation of these and other shift registers involves the reading in or feeding to the shift register of a train or series of "pulses" and "no-pulses" at a signal input point to a plurality of register stages, and the shifting through the stages of the register of the train or series of "pulses" and "no-pulses" toward a signal output point. The shifting is accomplished stepwise by periodically recurring clock or advancing pulses. For example, if "$n$" bits of information are contained in the train or series of "pulses" and "no-pulses," "$n-1$" advancing or clock pulses would read in or feed the information train to a shift register having "$n$" stages. Upon the occurrence of the nth pulse, the first bit of information will be read out of the shift register. This is referred to as a "serial reading" and as is well understood, the rate of reading in and/or the rate of reading out may be controlled in dependence upon the particular operational requirement. In lieu of serial reading out of the information from the shift register, the desired operation may require the changing of the serial in time digit or information bits to a parallel in time presentation. For this condition, the information is read into the plural stages of the register during "$n-1$" advancing or clock pulses. Parallel outputs are provided at the respective stages, such that upon occurrence of the "nth" clock pulse, the stored information bits are read out simultaneously. Before read out, the register serves as an indicator for the stored binary information.

Broadly, it is within the contemplation of the present invention to provide improved shift registers.

It has been found that reading out of information from shift registers of the magnetic core type, whether serially or by serial-parallel transformation requires one or more stages of amplification, in that the outputs of magnetic cores are limited to small values. Amplification becomes essential when component size is critical, as in constructing complex computing devices. Additionally, the use of magnetic-core shift registers for the serial-parallel transformation, requires individual amplifiers for the successive stages of the shift register. These difficulties as well as other requirements including simplicity, stability, and minimizing size, suggests the use of transistors as elemental components in shift registers.

Accordingly, it is an object of the present invention to provide a transistor shift register. Specifically, it is within the contemplation of the invention to improve and simplify shift registers by using current-multiplying transistors in the respective register stages.

It is a still further object of the present invention to provide a shift register having directly usable outputs requiring no amplification preliminary to performing a control function.

It is a further object of the present invention to provide a shift register designed to achieve the required shift and register functions with a minimum number of components. Advantageously, material simplification in circuitry is realized with a transistor as the main component of each register stage. Transistors have been used to accomplish the switching function of a shift register, but known circuits have been inflexible in respect to the type of information patterns sequences which could be handled successfully. These circuits were characteristically complex and undesirable from the standpoint of stability, economy, simplicity anad reliability. Any one of the above disadvantages as well as others could completely preclude the use of transistor shift registers in any of the many applications feasible in the automation field.

A further object of the invention is to provide a transistor shift register which is capable of receiving and storing information in any binary pattern or sequence. In particular, the present invention contemplates shift registers effective to handle and store an information series having successively occurring information bits of the same polarity.

A further consideration in design of shift registers is the speed of operation, of primary importance in many military applications. For example, in gunnery control the speed of register response must be exceptionally high and requires comparatively high frequency operation, usually in the megacycle range.

It is a further object of the invention to construct a shift register capable of high speed operation. In accordance with this aspect, shift registers are attainable having good frequency response in the megacycle range, and providing directly usable outputs of magnitudes sufficient for control without the need of external amplification.

In accordance with an illustrative embodiment demonstrating certain features of the invention, a shift register is provided which includes successive stages each having a bistable current-multiplying transistor. Intermediate the respective stages, which for convenience will be hereafter designated as the "memory" stages, are "temporary storage" or "delay" stages. Each delay stage derives its input from the preceding memory stage during an information or digit interval, and delivers its output to the next memory stage after a predetermined time delay. The presence of the temporary storage stages or sections are instrumental in meeting the requirement that the shift register be capable of storing any pattern of binary digits. However, the temporary storage stages are not effective to perform their delay function until such time as a control pulse is applied to the memory stages of the shift register.

As a feature of the invention, the intermediate temporary storage or delay stages may be monostable transistor circuits controlled from the preceding memory stage and arranged to switch the succeeding memory stage. Utilization of a monostable transistor circuit in a delay stage, in conjunction with a controlling memory stage is of special advantage in that the delay stage may be used as a source of resetting or clearing pulses. Thus, the associated memory stage can be automatically cleared or reset after information shift during an information interval or period, such that the associated stage is in condition for receiving the next information bit or representation.

As a still further feature of the invention, the intermediate or temporary storage stages may be bistable transistor circuits. These circuits are triggered or switched from one state of conduction to the other state of conduction by an associated memory stage to perform the temporary delay and storage function, and triggered from said other state of conduction to said one state of conduction by a secondary set of advanced or clock pulses coordinated to and timed with the primary set of advanced or clock pulses.

The above as well as further objects, features and advantages of the invention will be more fully appreciated upon reference to the detailed description of several presently preferred illustrative embodiments, when taken in conjunction with the accompanying drawings, wherein.

Figure 1:
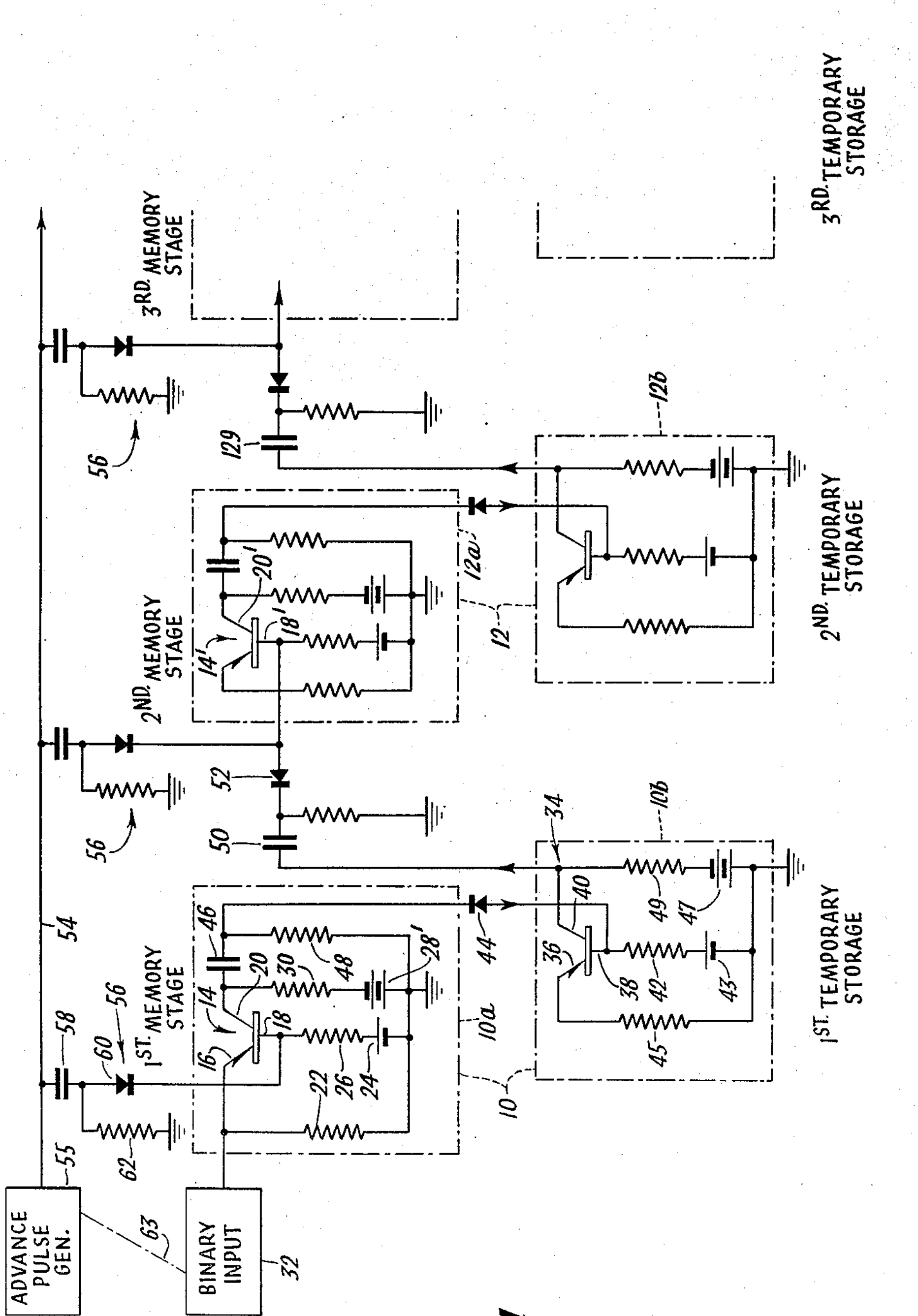
Fig. 1 is a partially complete and diagrammatic showing of an illustrative multiple-stage transistor shift register embodying features of the present invention.

Referring now specifically to Fig. 1, there is shown a shift register which may be made up of any number of register sections depending upon the binary requirement. Each of the sections 10, 12 . . . N includes a memory stage 10*a*, 12*a* . . . N*a* and a temporary or intermediate storage or delay stage 10*b*, 12*b* . . . N*b*. Each of the memory stages 10*a*, 12*a* . . . N*a* is illustrated as a bistable current-multiplying transistor switching circuit 14 including an emitter electrode 16, a base electrode 18, and a collector electrode 20. One form of transistor 14 suited for this purpose would include a body of N-type germanium with rectifying connections serving as the emitter and collector electrodes 16, 20, and an ohmic connection as the base electrode 18. The bistable or flip-flop characteristic is obtained by any well known expedient, as by using a relatively low impedance 22 in the emitter-base circuit. The circuit parameters are selected such that the emitter load line intersects the emitter-input characteristic at two stable operating points separated by a region of negative resistance, one operating point occurring in the negative emitter current region of the characteristic and corresponding to the "off" or "low-conduction" stable state, and the other operating point occurring in the positive emitter current and saturation region of the characteristic and corresponding to the "on" or "high-conduction" stable state. Another form of bistable transistor circuit is illustrated in my copending application Serial No. 401,657, filed December 31, 1953. Connected to the base electrode 18 is a suitable source of emitter biasing potential 24 and a series-connected base resistor 26. In the collector circuit is a suitable source of negative collector bias 28 and a series-connected load resistance 30. The operation of the described bistable transistor switching circuit, known per se, is such that the application of positive pulses to the emitter 16 switches or drives the transistor from the "off" or "low-conduction" stable state to the "on" or "high-conduction" stable state. Switching in the opposite direction may be accomplished by application of positive control pulses to the base electrode 18 of the transistor switching circuit.

An appropriate binary input 32 is derived, including a source of information pulses or bits and preferably a quantization circuit such that stable or regular pulse waveforms are obtained. It will be appreciated that upon the occurrence of each positive pulse indicating an information bit, the transistor switching circuit, in the "off" or "low-conduction" state will be switched to the "on" or "high-conduction" state producing a positive pulse at its collector 20. Occurrence of a "no-pulse," likewise indicating an information bit, does not effect the transistor 14 irrespective of its state.

As will be appreciated from inspection of the drawing, the second memory stage 12*a* of the second register section 12 is completely similar in all respects to the stage 10*a* with one exception, detailed hereinafter. Description of stage 12*a*, as well as illustration of further stages is dispensed with since the invention will be clear and readily understood from the showing in the drawings.

Each of the temporary or intermediate memory and storage stages 10*b*, 12*b* . . . N*b* is shown as a monostable current-multiplying transistor switching circuit 34 including an emitter electrode 36, a base electrode 38, and a collector electrode 40. This switching transistor circuit may be of the form described in connection with the register memory section 10*a*, but is arranged to have a monostable characteristic. In the form illustrated, the monostable characteristic is obtained by using a relatively low impedance 42 in the base circuit, or a relatively high bias 43 in the base circuit, such that the base load line intersects the base input characteristic at only one stable operating point. This stable operating point occurs in the negative emitter current region of the input characteristic, and corresponds to the "off" or "low-conduction" state of the monostable transistor. The usual emitter-return resistor 45 and collector supply 47 and load resistor 49 are connected in circuit with the transistor, as is well understood. Application of a negative pulse to the base electrode 38 in an amount sufficient to surpass the base threshold value, will drive the monostable transistor to an unstable "on" or "high-conduction" point for a period determined by the base input pulse width.

Base input and control of the temporary storage and delay stage 10*b* is obtained through a timing circuit including rectifier 44, a series-connected coupling condenser 46, and a shunt resistor 48. The diode or unidirectional device 44 is poled such that only negative pulses are passed from the collector circuit 20 of the bistable switching transistor 14 to the base 38 of the monostable time-delay transistor 34. Upon turning off the bistable transistor 14, that is switching to the "off" or "low-conduction" stable state, a negative pulse is derived at the collector 20 which is applied to the base electrode 38 of the transistor 34 of the temporary storage stage 10*b*. This negative pulse causes monostable "on" operation for a period depending upon the width of the input pulse derived from the collector 20. A condenser (not shown) may be connected in parallel with resistor 45 instead of relying on the timing circuit 46, 48 in establishing the desired temporary storage time. With this change, the width of pulse from the temporary storage stage will be independent of the input pulse width.

The output of the temporary storage stage 10*b* of the first register section 10 is coupled by circuit connections including a coupling condenser 50 and a unidirectional device 52 to the base 18′ of the bistable transistor 14′ of the second memory stage 12*b* of the register section 12. Upon the monostable transistor 34 returning to its "off" or "low-conduction" stable state, a negative pulse will be produced at the collector 40 which is effective at the base 18′ of the transistor 14′ to switch the second bistable memory stage 12*a* from its "off" or "low-conduction" stable state to its "on" or "high-conduction" stable state.

From the pattern of circuit connections previously described, it will be appreciated that the collector output of the second memory stage 12*a* controls the temporary shifting to and storing of information in the second intermediate storage stage 12*b*, which in turn controls the third memory stage of the third register section. Since the details of these further sections and their interconnection are apparent from the description of the first and second register sections 10, 12, further description will be dispensed with in the interests of simplicity. However, it is to be observed that the first memory stage 10*a* is controlled by application of positive pulses at the emitter 16, while the succeeding stages are switched from the "low-conduction" state to the "high-conduction" state by application of negative pulses at the bases, respectively. Evidently the first memory stage 10*a* could have input connection to its base 18, if the binary input pulses were negative.

A common connection 54 is provided from the several memory stages 10, 12, . . . N to a clock pulse or advanced pulse generator 55, with parallel isolated coupling networks 56 individual to the respective memory stages 10*a*, 12*a* . . . N*a*. Each of the isolating networks 56 includes a coupling condenser 58 and a unidirectional device 60 connected in series to the base electrode 18 of the bistable transistor 14. The unidirectional device 60 is shunted by a bleeder resistor 62 connected to ground. The advance or clock pulse generator is arranged to provide positive pulses at a recurrence rate selected to advance the register at predetermined intervals. Suitable means generally designated by numeral 63 may be provided for insuring the required recurrence rate of the advance pulse generator and the binary information input period. The timing of the shift register and the required time relationship between the several inputs will become apparent upon reference to a typical storage and shift cycle.

Figure 2:
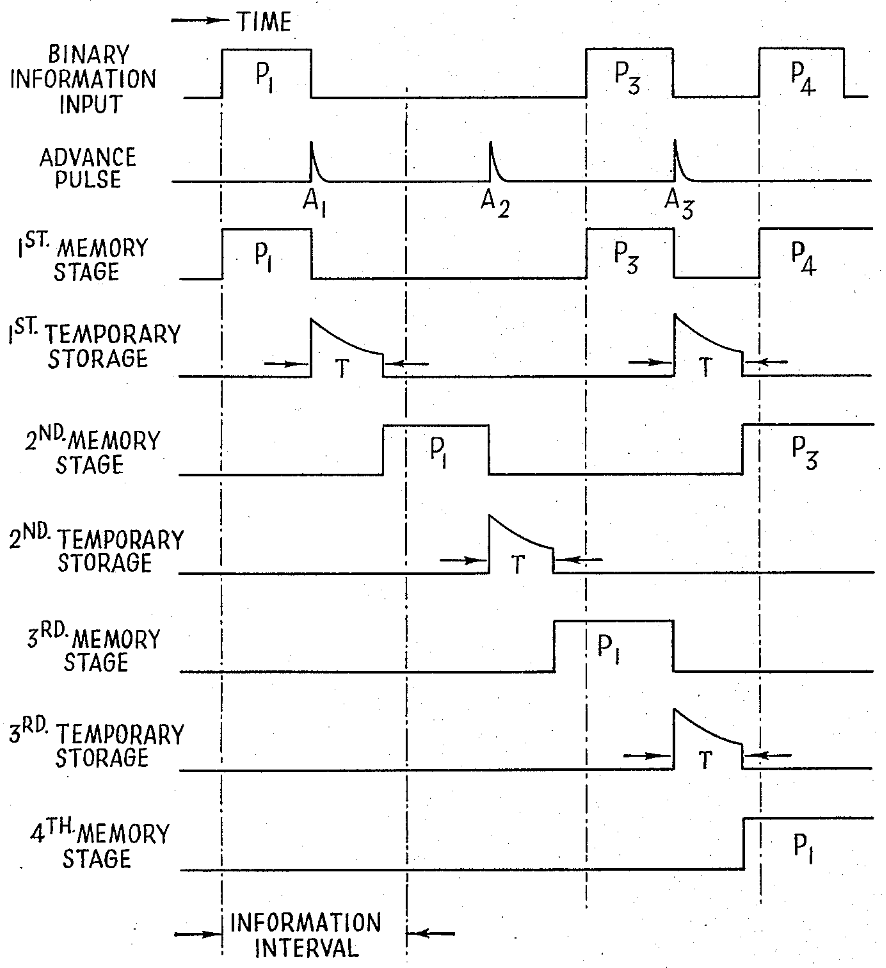
Fig. 2 is a diagram showing the timing relationships of the information pulses at different stages of operation of a four stage shift register, with an arbitrary train of information bits or pulses feed thereto.

The operation will be described in conjunction with a typical, but illustrative, four-stage shift register, with a signal input seen in Fig. 2 to include information bits during the first, third, and fourth information intervals.

During the first information interval, feed of the first bit or pulse P1 at the binary input 32 to the first register section 10 switches the bistable transistor 14 of the first memory stage 10*a* from the "low-conduction" or "off" state of the "high-conduction" or "on" stage. This is due to the application of a positive pulse at the emitter 16, as described. Although this will produce a positive pulse at the collector 20 of the switching transistor 14, this positive pulse will not effect the temporary storage stage 10*b*. The temporary storage stage is only responsive to negative pulses at the base input, and is isolated due to the presence of diode 44 in the control connection between the stages 10*a*, 10*b*.

Following the first binary signal input P1, and during the first information interval, an advanced pulse A1 is applied via lead 54 and the respective coupling networks 56 to all of the stages. The advance pulse is effective in the first register section 10 to switch the transistor 14 to the "off" or "low-conduction" state, causing a negative pulse output at the collector 20. This negative pulse is applied to the base control 38 of temporary storage stage 10*b* and brings about operation of the monostable transistor 34. After the recovery time T, the monostable transistor 34 of the temporary storage stage 10*b* returns to the "off" or "low-conduction" stable state, producing a negative pulse at collector 40. This negative pulse is effective in the second memory stage 12*a* to cause switching of this register section to the "on" or "high-conduction" state. The negative pulse produced by the temporary storage stage 10*b* is applied to the base 18' of memory stage 12*a* for control via the collector-base coupling connection including condenser 50 and isolating diode 52.

During the second information interval, there is no binary input to the first memory section 10 since the illustrative binary information input pattern has a "no-pulse" interval as the second information bit. Accordingly, the first memory stage 10*a* remains unchanged during the second information interval. However, the second memory stage 10*b*, which was previously switched to the "on" or "high-conduction" state during the first information interval, is switched to the "low-conduction" or "off" state by the next advanced or clock pulse A2. Switching "off" of the bistable switching stage 12*a* produces a negative pulse at collector 20' which in turn causes operation of the monostable transistor of the second temporary storage stage 12*b*. After the recovery time T of the monostable circuit 12*b*, a negative pulse is produced at its collector which causes delayed transfer of the first information but of pulse P1 to the third memory section.

During the third information interval, an information pulse or bit P3 is applied to the binary input 32 of the first register stage 10*a*. Upon occurrence of the third advancing pulse A3, this information bit will be transferred, by action of the monostable transistor 34 of the first temporary storage stage 10*b*, to the memory stage 12*a* of the second register section 12. This "reading-in" of the third information bit or pulse P3 is accomplished by the circuits, as described during the first information interval.

Concurrently, there is a similar transfer of the first information bit or pulse P1 from the memory stage of the third register section via the third temporary storage stage to the memory stage of the fourth register section.

During the fourth information interval, the fourth bit P4 is fed into the register by turning on or switching of the first memory stage 10*a*. Upon inspection of Fig. 2 in the portion of the diagram illustrating the fourth digit interval, it will be appreciated that the binary information input is stored in the four stages as a "high-conduction" state in the fourth memory stage, a "low-conduction" state in the third memory stage, and "high-conduction" states in the second and first memory stages. The respective "high-conduction" states corresponding to the "pulses" of the binary input, while the "low-conduction" state in the third memory stage corresponds to the "no-pulse" of the binary input. In this condition the information may be stored in the shift register indefinitely, or it may be read out immediately, as desired when the binary information has been read in, the advance pulse sequence is interrupted if immediate "read out" is not intended.

Upon occurrence of the next advance or clock pulse A4 the first information bit P1 will be read out serially of the shift register, further information bits being read out at later intervals as determined by the pulse rate of the advanced pulse generator.

Instead of serial "reading out," the illustrative circuit may be arranged to provide a serial-parallel transformation, by output connections to collectors 20, 20', etc. The stored indication may be suitably represented by like connection to the collectors.

Figure 3:
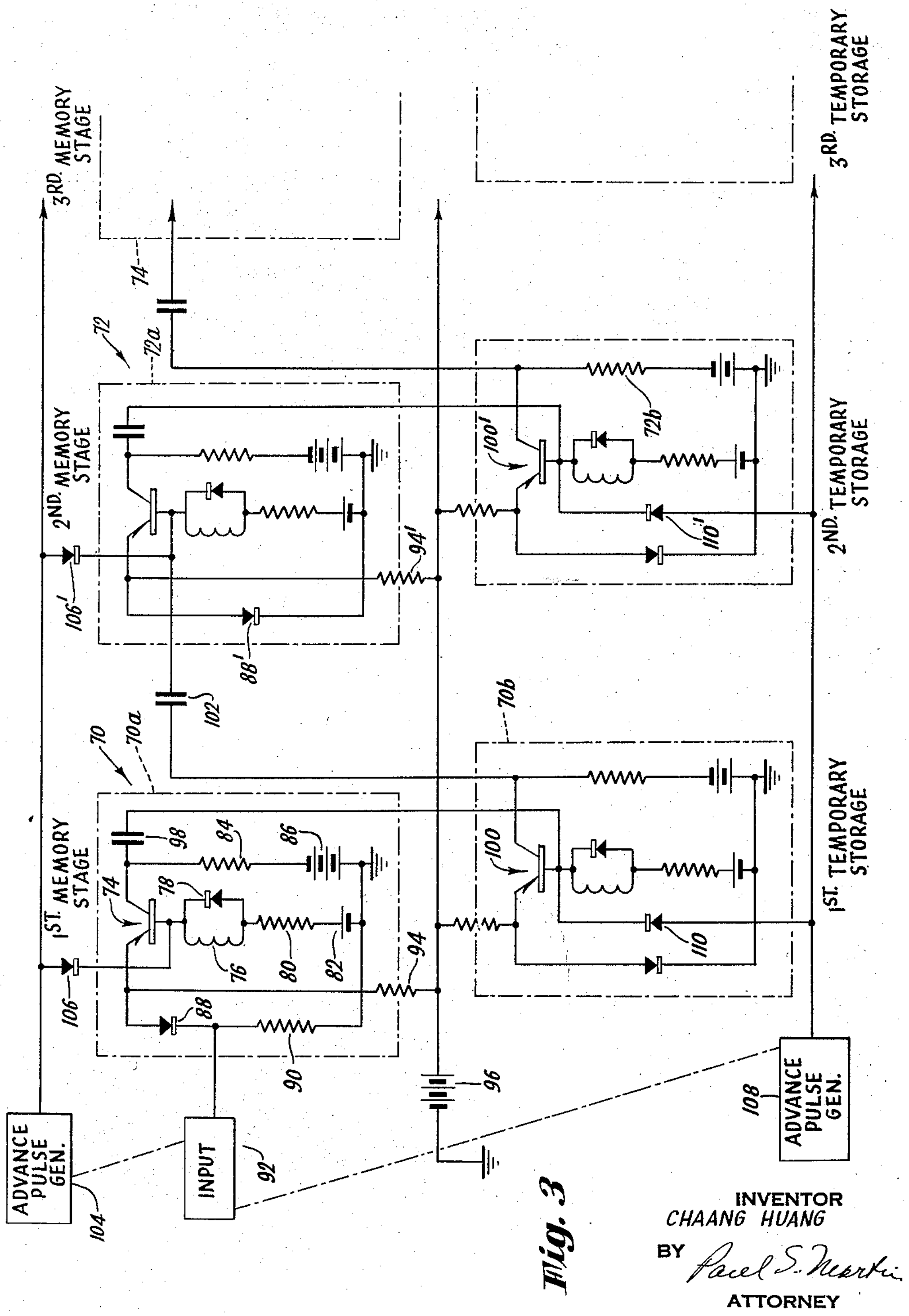
Fig. 3 is a diagrammatic showing of a multiple-stage shift register embodying still further features of the present invention, and particularly suitable for high frequency applications.

Reference will now be made to Fig. 3 wherein there is disclosed a further form of shift register particularly adapted to high frequency operation. This illustrates a modification of Fig. 1 in which the temporary storage stages indicated as monostable transistor circuits in Fig. 1 are replaced by bistable transistor stages. Connections are provided which, with the substituted bistable temporary storage stages, render the whole circuit effective for reliable high speed operation.

In Fig. 3 a series of register stages 70, 72 etc. are provided which correspond to stages 10, 12 etc. in Fig. 1. Each of the stages includes a memory transistor stage 70*a*, 72*a* etc. and a temporary storage stage 70*b*, 72*b* etc. corresponding respectively to stages 10*a*, 12*a* and 10*b*, 12*b* in Fig. 1. The collector output of stage 70*a* provides input for the temporary storage section 70*b* by the connection illustrated, and similarly the temporary storage stage 70*b* has a connection from its collector to the base of the transistor in the next following memory stage 72*a*, for impressing pulse output on that memory stage.

Stages 70*a* and 72*a* are very much alike and for this reason they will be described in first instance as if they were exactly alike. The same numerals are used for the components of both stages, primed numerals being used to distinguish components of stage 72*a*. Section 70*a* includes an impedance between the base of transistor 74 and ground which is made up of a peaking coil 76 and a shunt rectifier 78 of the point contact type, and in series with this there is a base load resistor 80. A bias supply 82 is connected to ground, in series with base resistor 80. Between the collector of transistor 74 and ground are the collector load resistor 84 and the collector bias supply 86. Between the emitter of transistor 74 and ground is a diode 88. In section 70*a*, different in this respect from section 72*a* and the other following memory stages, there is a resistor 90 whose value is made very low, so that an input pulse may be impressed on the emitter circuit without otherwise appreciably changing its operating characteristics. This input pulse is obtained from a source 92 of binary signals, just as in Fig. 1. At a circuit point between the emitter of transistor 74 and diode 88 there is a resistor 94 whose value is high and a large positive bias supply 96 is in series with this.

Supply 96 and resistor 94 act as a constant-current supply, and feed the two branching current paths, to the emitter of transistor 74 and to diode 88. This emitter and the diode are polarized so as to be forward-conducting in the same direction, away from resistor 94. This arrangement is effective, as described in my copending application Serial No. 401,657, filed December 31, 1953, to cause transistor 74 to operate either in the "off" condition, or in a comparatively low-current stable "on" condition. The transistor when "on" does not operate in its high-current, saturated, positive-resistance region but instead operates at a much lower current, in the negative-resistance region of the emitter characteristic. This circuit results in stable transistor operating points, yet responds at high speed for reversal from the "on" condition back to the "off" condition. The constant-current emitter-supply circuit is repeated in the next succeeding memory stage 72*a* as represented by resistor 94' and diode 88', and similarly in the succeeding stages.

Temporary storage sections 70*b*, 72*b* etc. are internally identical in all respects to the second memory stage 72*a*. These are bistabled transistor circuits designed as circuit components susceptible to extremely high speed switching from "on" to "off" and reversely.

Memory stage 70*a* has an output coupling via condenser 98 to impress input on the base of transistor 100 of temporary storage stage 70*b*. The output of stage 70*b* is connected from the collector of transistor 100 via condenser 102 to the base of transistor 74' in the second memory stage 72*a*. An advance pulse generator 104 is provided for the memory stages by way of isolating diodes 106, 106' etc. to the bases of the transistors 74, 74' etc. A similar advance pulse generator 108 is coupled via diodes 110 to the bases of transistors 100, 100' etc. in temporary storage stages 70*b*, 72*b'* etc. The output pulses of these advance pulse generators is positive in order that the pulses may switch the transistors from high current condition to their low current condition. The diodes 106 and 110 etc. are suitably polarized to transmit such pulse polarity. Advance pulse generators 104 and 108 are intercoupled so as to emit advance pulses in alternation, suitably timed with the input pulses from binary input source 92.

It seems needless to describe the operation of the circuit of Fig. 3 in that detail as was used in connection with Fig. 1. Significantly, however, the sections 70*b*, 72*b* etc. are not monostable stages but depend on advance pulses for switching them from their "on" condition to their "off" condition. Because of the fact that the transistor 100, 100' etc. are bistable and depend upon the occurrence of an advance pulse to switch them, the switching point can be very definitely established without any risk of variation characteristic of monostable temporary storage stages, and this definitely establishes the instant at which the pulses from the temporary storage sections 70*b*, 72*b* etc. are delivered to the next following memory stages 72*a*, 74*a* etc. Where high speed operation is required, it is evident that the circuit of Fig. 3 with the slight added complexity is to be preferred over that of Fig. 1. The information-bit interval can be made very short with the system in Fig. 3.

It is evident that a wide variety of detailed modifications and varied applications of the foregoing circuits will be suggested by the illustrative disclosure and accordingly the appended claims should be construed broadly, consistent with the spirit and scope of the invention.

What is claimed is:

A binary shift register comprising plural register sections each having a bistable memory stage and a bi-stable temporary storage stage, each of said memory and temporary storage stages including only one transistor, each of said stages having components in the emitter-base circuit of the transistor related to provide a negative resistance region in the input characteristic and two stable conduction states of operation for each stage, a binary signal input connected to the emitter-base circuit of the transistor in the memory stage of the first register section effective to change the potential difference between the emitter and base of the transistor and thereby switch said first memory stage from one stable conduction state to the other stable conduction state, a first source of advance pulses connected to the emitter-base circuit of the transistor in each of said memory stages for changing the potential difference between the emitter and base of each of the transistors and thereby switching said memory stages from said other stable conduction state to said one stable conduction state, and a second source of advance pulses connected to the emitter-base circuit of the transistor in each of said temporary storage stages for changing the potential difference between the emitter and base of each of the transistors and thereby switching said temporary storage stages from said other stable conduction state to said one stable conduction state, a control circuit connected between the collector of the transistor in the memory stage and the emitter-base circuit of the transistor in the temporary storage stage of each register section effective to change the potential difference between the emitter and base of the transistor in the temporary storage stage and thereby switch the temporary storage stage to said other stable conduction state in response to switching of the memory stage to said one stable conduction state, and signal input connections from the collector of the transistor in the temporary storage stage of each register section to the emitter base circuit of the transistor in the memory stage of the next following section arranged to change the potential difference between the emitter and base of the transistor in the memory stage and thereby to switch same from one stable conduction state to the other stable conduction state in response to switching of the associated temporary storage stage from the other stable conduction state to the one stable conduction state.

References Cited in the file of this patent

UNITED STATES PATENTS

| | | |
|---|---|---|
| 2,622,213 | Harris | Dec. 16, 1952 |
| 2,680,819 | Booth | June 8, 1954 |